(12) United States Patent
Tessieres et al.

(10) Patent No.: US 10,310,297 B2
(45) Date of Patent: Jun. 4, 2019

(54) METHOD FOR DETERMINING AN OPTICAL EQUIPMENT COMPRISING AT LEAST ONE OPTICAL LENS AND A SPECTACLE FRAME

(71) Applicant: Essilor International, Charenton-le-pont (FR)

(72) Inventors: Melanie Tessieres, Charenton-le-pont (FR); Cédric Begon, Charenton-le-pont (FR)

(73) Assignee: Essilor International, Charenton-le-Pont (FR)

( * ) Notice: Subject to any disclaimer, the term of this patent is extended or adjusted under 35 U.S.C. 154(b) by 343 days.

(21) Appl. No.: 15/109,419

(22) PCT Filed: Dec. 30, 2014

(86) PCT No.: PCT/EP2014/079416
§ 371 (c)(1),
(2) Date: Jun. 30, 2016

(87) PCT Pub. No.: WO2015/101616
PCT Pub. Date: Jul. 9, 2015

(65) Prior Publication Data
US 2016/0327812 A1    Nov. 10, 2016

(30) Foreign Application Priority Data

Jan. 3, 2014 (EP) .................................... 14305005

(51) Int. Cl.
*G02C 13/00* (2006.01)
*G02C 7/02* (2006.01)
*G02B 1/11* (2015.01)
*G02C 7/10* (2006.01)

(52) U.S. Cl.
CPC .............. *G02C 13/003* (2013.01); *G02B 1/11* (2013.01); *G02C 7/024* (2013.01); *G02C 7/027* (2013.01);
(Continued)

(58) Field of Classification Search
CPC .... G02C 13/00; G02C 13/003; G02C 13/005; G02C 7/024; G02C 7/027; G02C 7/10; G02C 2202/06; G02B 1/11
(Continued)

(56) References Cited

U.S. PATENT DOCUMENTS 9,649,032 B2 * 5/2017 Liang ..................... G02C 7/02
9,826,899 B2 * 11/2017 Liang ..................... G02C 7/02
(Continued)

FOREIGN PATENT DOCUMENTS

DE    10 2009 004 380    7/2010
EP    2 161 611    3/2010
(Continued)

*Primary Examiner* — William R Alexander
(74) *Attorney, Agent, or Firm* — Oblon, McClelland, Maier & Neustadt, L.L.P.

(57) ABSTRACT

Method for determining optical equipment comprising at least one optical lens and a spectacle frame. Wearer data relating to the wearer's optical requirements, wearer's face morphology and optical equipment position on the wearer face are provided. An optical cost function is provided related to an optical function of the at least one optical lens when worn by said wearer. A light protection cost function is provided related to a spectral irradiance estimation over the wearer eye and/or wearer skin in a peri-orbital zone of the wearer eye under a given condition when said optical equipment is worn by said wearer. The optical equipment that minimizes the difference between a global cost function and a target value of the global cost function is determined, the global cost function being a function of the optical and the light protection cost functions.

15 Claims, 3 Drawing Sheets

(52) U.S. Cl.
CPC ............ G02C 7/10 (2013.01); G02C 13/005 (2013.01); *G02C 2202/06* (2013.01)

(58) Field of Classification Search
USPC .................................................... 351/159.75
See application file for complete search history.

(56) References Cited

U.S. PATENT DOCUMENTS

| | | | | |
|---|---|---|---|---|
| 2011/0166834 | A1* | 7/2011 | Clara | G02C 13/003 703/1 |
| 2012/0057123 | A1* | 3/2012 | Mandler | G02C 7/02 351/159.74 |
| 2012/0057124 | A1* | 3/2012 | Spivey | G02C 7/02 351/178 |
| 2013/0341523 | A1* | 12/2013 | Citek | G02C 7/028 250/372 |
| 2014/0002799 | A1* | 1/2014 | Wildsmith | A61B 3/00 351/223 |
| 2014/0008543 | A1* | 1/2014 | Citek | G02C 7/028 250/372 |
| 2015/0049304 | A1* | 2/2015 | Cussac | G02C 7/028 351/159.75 |
| 2015/0055085 | A1* | 2/2015 | Fonte | G06Q 30/0621 351/178 |

FOREIGN PATENT DOCUMENTS

| | | |
|---|---|---|
| EP | 2 607 884 | 6/2013 |
| WO | WO 2005/050289 | 6/2005 |
| WO | WO 2012/076714 | 6/2012 |

\* cited by examiner

METHOD FOR DETERMINING AN OPTICAL EQUIPMENT COMPRISING AT LEAST ONE OPTICAL LENS AND A SPECTACLE FRAME

RELATED APPLICATIONS

This is a U.S. national stage application under 35 USC § 371 of application No. PCT/EP2014/079416, filed on Dec. 30, 2014. This application claims the priority of European application no. 14305005.2 filed Dec. 30, 2014, the entire content of which is hereby incorporated by reference.

FIELD OF THE INVENTION

The invention relates to a method for determining an optical equipment comprising at least one optical lens and a spectacle frame, the optical lens being adapted to be mounted in the spectacle frame in front of a wearer eye. The invention further relates to a computer program product comprising one or more stored sequences of instructions that are accessible to a processor and which, when executed by the processor, cause the processor to carry out the steps of the methods according to the invention.

BACKGROUND OF THE INVENTION

The discussion of the background of the invention herein is included to explain the context of the invention. This is not to be taken as an admission that any of the material referred to was published, known or part of the common general knowledge at the priority date of any of the claims.

Light radiation according to their spectral range (UV, visible, IR) can be harmful and/or uncomfortable for the wearer of an optical equipment comprising optical lenses mounted in a spectacle frame.

Among the radiation that may arrive to the eye of the wearer or to the skin in a peri-orbital zone of the wearer one may consider the following type of radiation.

First, transmitted radiation entering through the front face of the optical lens and transmitted up to the eye. Such radiation arrive to the eye either directly by two refractions or by a more complex path with internal reflections on the rear face of the optical lens and then on the front face of the optical lens before being finally refracted by the rear face of the optical lens and reach the eye of the wearer.

Secondly, the reflected radiation that arrive to the eye after having been reflected by the rear face of the optical lens. Typically the radiation arriving from behind the wearer may if they are not subjected to a shadowing effect of the head of the wearer or of the spectacle frame, be reflected by the rear face of the optical lens towards the eye of the wearer.

Thirdly, direct radiation that arrive directly to the eye of the wearer without been reflected or transmitted by the optical lens.

Generally, optical lenses effectively absorb harmful UV radiation that could be transmitted directly through the lens and transmit useful visible radiation. But radiation arriving from behind the wearer may be reflected by the multilayer coating applied to the rear face of the lens and therefore reach the eye of the wearer. Standard multilayer coatings are designed so as to reduce the amount of uncomfortable visible radiation being reflected.

Specific coatings that reduces the reflection of UV radiation may be applied on the back surface of the optical lens so as to limit the dangerous radiation that reach the eye of the wearer after having been reflected on the rear surface of the optical lens.

However, many other parameters than the coating of the rear surface of the optical lens may influence the quantity of indirect radiation reaching the eye of the wearer. For example the shape of the spectacle frame and/or the morphology of the face of the wearer and/or the geometry of the optical lens may influence the amount of indirect radiation reaching the eye of the wearer. The geometry of the optical lens may also influence the number of direct radiation reaching the eye of the wearer after having passed through the optical lens.

SUMMARY OF THE INVENTION

Therefore, it appears that there is a need to provide an improved optical equipment that is arranged to reduce the number of undesired radiation that reach the eye of the wearer either by reflection on the rear surface of the optical lens or through the optical lens.

To this end, one aspect of the invention is directed to a method, for example implemented by computer means, for determining an optical equipment comprising at least one optical lens and a spectacle frame, the optical lens being adapted to be mounted in the spectacle frame in front of a wearer eye, the method comprising:

a wearer data providing step, during which wearer data relating at least to the wearer's optical requirements, to a wearer's face morphology and to the optical equipment position in respect with the wearer face when said optical equipment is worn by said wearer are provided, an optical cost function providing step, during which an optical cost function is provided, the optical cost function being related to an optical function of the at least one optical lens when said optical equipment is worn by said wearer, a light protection cost function providing step, during which a light protection cost function is provided, the light protection cost function being related to at least a spectral irradiance estimation over the wearer eye and/or wearer skin in a peri-orbital zone of the wearer eye under at least a given condition when said optical equipment is worn by said wearer, an optical equipment determining step, during which the optical equipment that minimizes the difference between a global cost function and a target value of the global cost function is determined by modifying at least one parameter of the optical equipment, the global cost function being a function of the optical and the light protection cost functions.

Advantageously, considering a global cost function that is function of a light protection cost function during the optical equipment determining step allows providing an optical equipment optimized according to a spectral irradiance of the wearer eye and/or wearer skin in a peri-orbital zone.

In other words, unlike what was done up to now, the optical equipment determined according to an embodiment of the invention is not only determined according to the optical function but also according to the light protection provided by said optical equipment.

Furthermore, the method according to an embodiment of the invention allows determining an optical equipment suitable to the morphology of the face of a wearer, and/or the atmospheric condition in which the optical equipment is to be used, and/or to specific wearing conditions of said optical equipment.

In other words, the method according to an embodiment of the invention is a tool that allows determining a customized equipment by taking into account the specificities of individualized usage contexts. This is a technical breakthrough as compared to established design techniques for ophthalmic lenses and eyewear optical equipment.

According to further embodiments which can be considered alone or in combination:

the given condition comprises an information regarding a location of at least one scene in which said wearer stands, said at least one scene comprising a spatial repartition of spectral albedo and at least one radiance source, said at least one radiance source having a determined emitting spectrum and a position in respect with the wearer's face when said optical equipment is worn by said wearer, wherein said light protection cost function providing step involves a step of modeling the irradiance coming from said at least one scene highlighted by said at least one radiance source; and/or said determined emitting spectrum is limited to at least a spectral window such as a UV-A window, UV-B window, visible window, near infrared window, mid infrared window, far infrared window; and/or said optical cost function being determined by considering a first spectral window, said light protection cost function being determined by considering a second spectral window, wherein said first spectral window and said second spectral window are different; and/or said radiance source is the sun or an artificial radiance source; and/or said scene location is defined by a position on Earth and said given condition comprises information of date and time; and/or when said at least one radiance source is the sun, said position on Earth and said information of date and time are used for determining a sun elevation; and/or the given condition comprises an aerosol composition of the scene atmosphere and/or a description of clouds covering the scene; and/or the given condition comprises information on polarization of radiance reflected by said spatial repartition of spectral albedo; and/or said optical equipment determining step involves a step of determining a set of value ($OCF_1$, . . . , $OCF_n$; $LPCF_1$, . . . , $LPCF_n$) for said optical cost function and for said light protection cost function in considering a set of value of at least one parameter of the optical equipment for determining said optical equipment that minimizes the difference between a global cost function and a target value of the global cost function; and/or said at least one parameter of the optical equipment is a geometrical parameter of the at least one optical lens; and/or said at least one parameter of the optical equipment is chosen within the list consisting of:

a distance separating the rear face of said at least one optical lens and the wearer eye, when said optical equipment is worn by said wearer;

a wrap angle and/or a pantoscopic angle of said at least one optical lens;

a curvature map of the rear face of said at least one optical lens;

a curvature map of the front face of said at least one optical lens;

a contour shape of said at least one optical lens; and/or the at least one parameter of the optical equipment is an anti-reflecting coating parameter; and/or the anti-reflecting coating parameter relates to a choice of an anti-reflecting coating in a list of anti-reflecting coatings; and/or said at least one parameter of the optical equipment is a geometrical parameter of the spectacle frame; and/or said at least one parameter of the optical equipment is chosen within the list consisting of:

a spatial map of radiance attenuation coefficient of said at least one optical lens;

a radiance polarization coefficient of said at least one optical lens, and/or the target value of the global cost function is determined at least partially from an eye-safety recommendation comprised in a standard; and/or the target value of the global cost function is determined at least partially from wearer data provided by the wearer or measured on the wearer; and/or said light protection cost function providing step involves a step of determining a position of the least one optical lens in respect with the wearer eye when said optical equipment is worn by said wearer, wherein said step of modeling the position of the least one optical lens considers real wearing parameters determined on the wearer when the wearer is wearing a try frame identical to the spectacle frame; and/or wearer data further comprises data belonging to a type chosen within the list consisting in:

wearer vision behavior;

wearer personalized light sensitivity;

wearer aesthetic optical lens preference;

wearer occupational activity;

wearer age.

According to a further aspect, the invention relates to a computer program product comprising one or more stored sequences of instructions that are accessible to a processor and which, when executed by the processor, cause the processor to carry out the steps of the methods according to the invention.

According to another aspect the invention relates to a program which makes a computer execute the method of the invention.

Another aspect of the invention relates to a computer readable medium carrying one or more sequences of instructions of the computer program according to an embodiment of the invention.

Another aspect of the invention relates to a computer-readable storage medium having a program recorded thereon; where the program makes the computer execute the method according to an embodiment of the invention.

Another aspect of the invention relates to a device comprising a processor adapted to store one or more sequences of instructions and to carry out at least one of the steps of a method according to an embodiment of the invention.

BRIEF DESCRIPTION OF THE DRAWINGS

Non limiting embodiments of the invention will now be described with reference to the accompanying drawing wherein.

Figure 1:
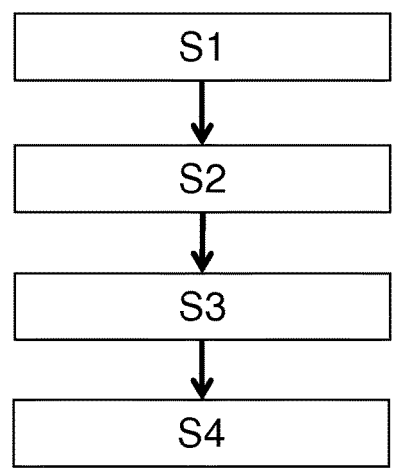
FIG. 1 is a flow chart of a method according to a first embodiment of the invention.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF THE DRAWINGS

In the framework of the invention, the following terms have the meaning indicated herein below.

The term "optical lens" is to be understood to mean any type of known lens intended to be supported by a wearer's face. The term can refer to ophthalmic lenses such as non-corrective lenses, corrective lenses, such as progressive addition lenses, unifocal or multifocal lenses. The term can also refer to said ophthalmic lenses which could present at least one added value such as, for example, tint, photochromism, polarization filtering, electrochromism, antireflective properties, antiscratch properties . . . .

The term "optical equipment" is to be understood to mean any type of known eyeglasses comprising a spectacle frame and at least an optical lens. The optical equipment may comprise a single optical lens covering either both eyes of the wearer, for example goggles or masks, or only one eye, for example a head mounted display. The optical equipment may comprise two optical lenses each covering an eye of the wearer. The term can refer to ophthalmic optical equipment, non-ophthalmic optical equipment, sunglasses, glasses for sporting applications such as goggles, reading glasses, protective glasses, driving glasses.

The term 'prescription' is to be understood to mean a set of optical characteristics of optical power, of astigmatism, of prismatic deviation, and, where relevant, of addition, determined by an ophthalmologist or optometrist in order to correct the vision defects of the wearer, for example by means of a lens positioned in front of his eye. For example, the prescription for a progressive addition lens comprises values of optical power and of astigmatism at the distance-vision point and, where appropriate, an addition value.

The pantoscopic angle is the angle in the vertical plane between the optical axis of the optical lens and the visual axis of the eye in the primary position, usually taken to be the horizontal.

The wrap angle is the angle in the horizontal plane between the optical axis of the optical lens and the visual axis of the eye in the primary position, usually taken to be the horizontal.

The optical axis of an optical lens is the direction perpendicular to the front face of the optical lens and passing through the optical center of the optical lens or the prism reference point (PRP) in the case of a progressive optical lens.

The method according to the invention comprises determining the distribution of light rays reaching the eye and peri-orbital zone of the wearer. This whole area of the eye and peri-orbital zone is defined as the exposure area.

The term "simulation" is used to refer to radiometric and optical simulation. This is a ray tracing computation technique taking into account not only the geometric characteristics of rays (these are vectors defined by their starting point, their direction in 3D space), but also their respective energy, their spectral range and possibly their polarization. The ray tracing is the calculation of the propagation path of light rays in the different environments of the system considered. A ray having a wavelength $\lambda$ is propagated in a straight line along its direction vector until it meets an interface between two media of different refractive indices at the wavelength $\lambda$, then it is refracted, reflected (directly or diffuse) or absorbed according to the Snell-Descartes law. The intersection point and the new direction of the beam after interaction with the surface is calculated by the software and the ray propagates until it encounters another surface (which may be the same as in the previous function the geometry of the system).

The term "cone" and therefore the term "cone of incidence" are used in a broad sense to simplify the description. The cone of incidence is actually the envelope of a distribution of light rays over the optical lens. This distribution is composed of all rays (with characteristics described in the previous explanation) incident on the faces of the optical lens that actually optically interact with the lens surfaces. This cone contains only the rays that actually reach one side of the optical lens because even with a radiation source emitting in all directions of space, some of these directions do not allow the rays to reach the optical lens since they would be stopped by the shading of the head or of the frame. Due to this definition of the envelope, this distribution of rays is not limited to the geometry of only one perfect cone as commonly known in Mathematics or Physics. It may indeed have multiple cones, or one or more sets of implications of any shape.

The invention relates to a method, for example implemented by computer means, for determining an optical equipment. The optical equipment typically comprises at least one optical lens and a spectacle frame, the optical lens being adapted to be mounted in the spectacle frame in front of a wearer eye.

The method according to the invention allows determining an optical equipment for a wearer having an enhanced and personalized protection against light radiation. Such result is achieved by optimizing the light radiation distribution on the eye and the peri-orbital zone of the wearer. This optimization may be carried out using photometric flow simulations of radiation refracted or reflected by the optical lens of the optical equipment.

As represented on FIG. 1, the method according to the invention comprises at least:
a wearer data providing step S1,
an optical cost function providing step S2,
a light protection cost function providing step S3, and
an optical equipment determining step S4.

Wearer data are provided during the wearer data providing step. The wearer data relate at least to the wearer's optical requirements, to a wearer's face morphology and to the optical equipment position in respect with the wearer face when said optical equipment is worn by said wearer.

The wearer's optical requirements may comprise the wearer's prescription when the optical lens is an ophthalmic lens. The wearer's optical requirement may also comprise an indication that the wearer does not require any ophthalmic prescription.

The wearer's face morphology may relate to the shape and position of the nose and/or of the pinna and/or of the temporal zones of the wearer and/or the hairs of the wearer.

The wearer data may further comprise wearer vision behavior data relating to the vision behavior of the wearer. Typically, the eye/head movement strategy of the wearer may be considered.

Indeed, individuals have different propensity to move either their eyes or their head when successively looking in different directions. Such propensity can be of importance when determining an optical lens. For example if the wearer has a great tendency of moving his head, he will be using mostly the central part of the optical lens whereas if he as a great tendency of moving his eye he may be using the peripheral part of the optical lens more.

The wearer data may further comprise an indication of the wearer light sensitivity. Indeed, all wearer do not have the same sensitivity to light. In particular the color of the iris of the wearer's eyes may provide an indication of such light sensitivity.

The wearer data may further comprise aesthetic optical preference of the wearer, such as the desired curve of the front face of the optical equipment or requirements on the difference of curve between the front of the spectacle frame and the front face of the optical lens.

The wearer data may further comprise indication of the activity of the wearer when wearing the optical equipment. Indeed, when determining the optical equipment, in particular for the light protection function, the type of activity of the wearer may be important. Typically, the requirements in terms of light protection are not the same when the optical equipment is to be used for reading than for skiing or sailing.

The wearer data may comprise an indication of the preferred geographic localization in which the wearer is to use the optical equipment. Indeed, such indication may provide useful indication on the type of illumination to be considered in the method according to the invention. The lightening conditions differ from place to place and even depending on the time of the year and/or of the day.

Advantageously, the method according to the invention allows determining an optical equipment adapted to the lightening conditions of a specific place on earth and even for a specific time of the year or of the day.

The wearer data may further comprise an indication on the age of the wearer.

An optical cost function is provided during the optical cost function providing step S2.

The optical cost function relates to the optical function of the at least one optical lens when said optical equipment is worn by said wearer.

In the sense of the invention, the optical function corresponds to a function providing for each gaze direction the effect of the optical lens on the light ray passing through the optical lens. The optical function may be defined only part of the optical lens, the part of optical interest, i.e. the part of the optical lens that is the most used by the wearer.

The optical function may comprise as dioptric function, light absorption, polarizing capability, reinforcement of contrast capacity, etc. . . . . .

The dioptric function corresponds to the optical lens power (mean power, astigmatism etc . . . ) as a function of the gaze direction.

A light protection cost function is provided during the light protection cost function providing step S3.

The light protection cost function relates at least to a spectral irradiance estimation over the wearer eye and/or the wearer skin in a peri-orbital zone of the wearer eye under given conditions when the wearer is wearing the optical equipment.

The given conditions may comprise information regarding a scene or visual environment in which the wearer is to standing.

The scene comprises at least one radiance source and a spatial repartition of spectral albedo. The radiance source has a determined emitting spectrum and a given position with respect to the wearer face when the optical equipment is worn by the wearer.

The emitting spectrum may be limited to a spectral window such as a UV-A or UV-B. The spectral boundaries depending on the definition used, for example if one refers to ISO standard 8980-3 for spectral boundaries in UV and visible, one would consider UVB between 280 and 315 nm, UVA between 315 and 380 nm, visible between 380 and 780 nm.

The near infrared window could be considered from 0.78 µm to 3 µm, the mid infrared window, typically from 3 µm to 50 µm, the far infrared window, typically from 50 µm to 1 mm. As for the UV, the spectral boundaries depend on the reference used to define it. For example in ICNIRP guidelines on limits of exposure to infrared radiation, the infrared region is subdivided into IR-A from 0.78 µm to 1.4 µm, IR-B from 1.4 µm to 3 µm and IR-C from 3 µm to 1 mm.

The same radiance source may be used to estimate the optical function.

According to an embodiment of the invention, the optical function is estimated in a first spectral window different from the second spectral window used to estimate the light protection function.

Typically, the optical function is estimated in the visible window whereas the light protection function is estimated in the UV-A or B windows.

The radiance source may be a natural source, typically the sun or an artificial radiance source. The choice between natural and artificial radiance source may be done based on the type of activity the wearer is to carry out when wearing the optical equipment.

The position on Earth and date and time may be considered when determining the radiance source and the spatial repartition of spectral albedo. Typically, when the radiance source is the sun the position on Earth, the date and hour can be used to determine the sun elevation. The given condition may comprise an aerosol composition of the scene atmosphere and/or a description of clouds covering the scene.

The given condition may further comprise information on polarization of radiance reflected by said spatial repartition of spectral albedo.

An optimized optical equipment is determined during the optical equipment determining step S4.

The optimized optical equipment corresponds to a configuration of an optical equipment that minimizes the difference between a global cost function and a target value of the global cost function. The global cost function is function of the optical and the light protection cost functions. For example, the global cost function may be a weighted sum of the optical and the light protection cost functions, wherein none of the weight coefficients are equal to zero.

Typically, the optical equipment determining step comprises a simulation step during which the irradiance coming from a scene highlighted by said at least one radiance source is simulated.

According to an embodiment of the invention the optical equipment determining step involves a step of determining a set of values ($OCF_1$, . . . , $OCF_n$) for the optical cost function ($LPCF_1$, . . . , $LPCF_n$) and for the light protection cost function in considering a set of values of at least one parameter of the optical equipment for determining said optical equipment that minimizes the difference between a global cost function and a target value of the global cost function.

The target value of the global cost function may be determined at least partially from an eye-safety recommendation comprised in a standard and/or from wearer data provided by the wearer or measured on the wearer.

Typically, at least one parameter of the optical equipment is a geometrical parameter of the optical lens of the optical equipment.

The at least one parameter of the optical equipment parameter may relate to:

a distance separating the rear face of said at least one optical lens and the wearer eye, when said optical equipment is worn by said wearer; and/or a wrap angle and/or a pantoscopic angle of said at least one optical lens; and/or a curvature map of the rear face of said at least one optical lens; and/or a curvature map of the front face of said at least one optical lens; and/or a contour shape of said at least one optical lens.

According to an embodiment, at least one parameter of the optical equipment is an anti-reflecting coating parameter relating for example to the choice of an anti-reflecting coating among a list of anti-reflecting coatings.

The least one parameter of the optical equipment may be chosen within the list consisting in:

a spatial map of radiance attenuation coefficient of said at least one optical lens;

a radiance polarization coefficient of said at least one optical lens.

Figure 2:
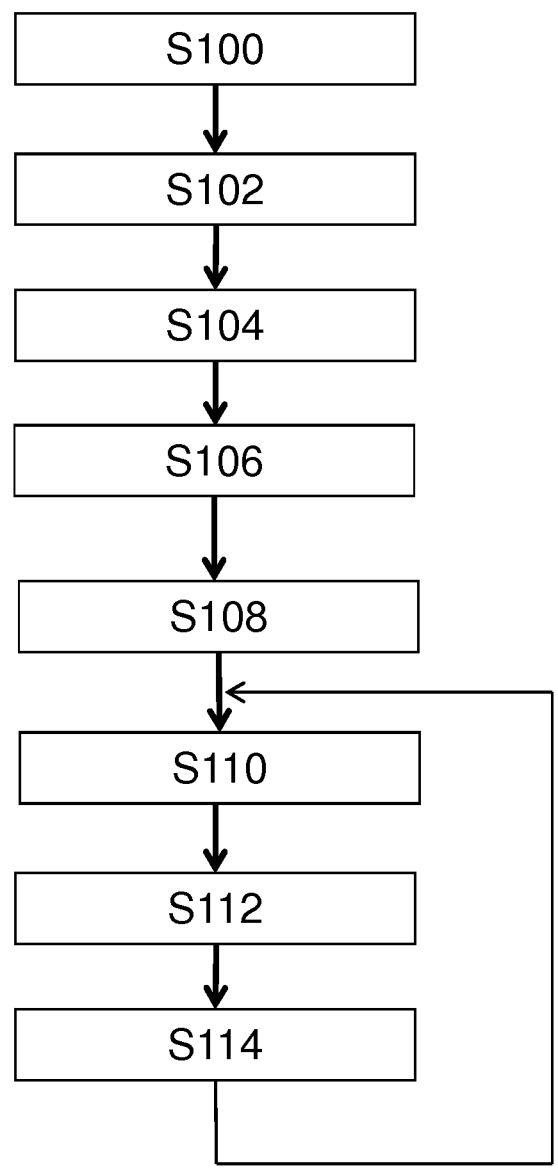
FIG. 2 is a flow chart of a method according to a further embodiment of the invention.

The modeling step may further comprise determining a position of the least one optical lens in respect with the wearer eye when the optical equipment is worn by the wearer. Typically, the position of the optical lens considers real wearing parameters determined on the wearer when the wearer is wearing a try frame identical to the spectacle frame. These wearing parameters consisting in:

a wrap angle of said at least one optical lens, when said optical equipment is worn by said wearer;

a pantoscopic angle of said at least one optical lens, when said optical equipment is worn by said wearer;

a distance separating the rear face of said at least one optical lens and the wearer eye, when said optical equipment is worn by said wearer;

FIG. 2 represents a flowchart of a method according to an embodiment of the invention. As illustrated on FIG. 2, the method according to such embodiment comprises:

a wearer data providing step S100,
a cone of incidence determining step S102,
a target light distribution providing step S104,
an initial optical lens determining step S106,
an initial light distribution determining step S108,
a light distribution comparing step S110,
an optical equipment parameter modifying step S112,
a light distribution determining step S114.

the light distribution comparing step S110, the optical lens parameter modifying step S112, and the light distribution determining step S114 are repeated until the difference between the light distribution and the target light distribution is smaller than a threshold value.

As described in detail previously, during the wearer data providing step S100, wearer data are provided. The wearer data relate at least to the wearer's optical requirement, to the wearer's face morphology and to the optical equipment position in respect with the face of the wearer when the optical equipment is worn by the wearer.

Based on the different data comprised in the wearer data, the cone of incidence can be determined during the cone of incidence determining step S102.

For example using a ray tracing simulation, one may determine the light rays that starting from the light source hit the optical lens.

A target light distribution over the eye and/or the penorbital zone of the wearer is provided during the target light distribution providing step S104. The target light distribution may be determined using eye safety recommendation comprised in standards. The light target distribution can be wavelength dependent. In other words depending on the wavelength, the target distribution may be different.

For example the target distribution may correspond for visible light to a maximum of the light rays reaching the eye of the wearer after being transmitted by the optical lens and for UV to a minimum of light rays reaching the eye of the wearer whatever the light path followed by UV radiation.

An initial optical lens is determined during the initial optical lens determining step S106. The initial optical lens may be determined based on the desired optical function. Typically using known optimization methods, one may determine surfaces of the front and rear faces of the optical lens, the distance between both surfaces and the refractive index of the optical lens so as to fulfil at best the optical function requirements.

Such initial optical lens determining step is typically done through ray tracing computation.

An initial light distribution is determined for the initial optical lens determined during the initial optical lens determining step. Typically, the initial light distribution is determined by ray tracing simulation using the cone of incidence.

The initial light distribution is compared to the target light distribution during the light distribution comparing step S110.

At least one parameter of the optical equipment is modified during the optical equipment parameter modifying step S112.

Among the parameters of the optical equipment that may be modified during the optical equipment parameter modifying step S112, one may consider two groups: the parameters that may change the optical function of the optical lens in the visible band (e.g noticeable by the wearer) and the parameters that do not influence the optical function of the optical lens in the visible band (presumably not noticeable by the wearer).

Among the parameters that may change the optical function, for given worn condition, one may consider the surfaces of the optical lens and the geometry of the spectacle frame.

Typically, the surface of the rear face of the optical lens may be modified to reduce the number of light rays that may reach the eye of the wearer after being reflected on the rear face of the optical lens. Given the changes of the surface of the rear face of the optical lens, the surface of the front face of the optical lens is to be modified so as to maintain overall optical performance of the optical lens. Such compensation change of the surface of the front face of the optical lens may be limited to the changes of the surface of the rear of the optical lens that are done in a zone of optical interest. Typically, if the extreme periphery of the surface of the rear face of the optical lens is changed, one may consider not changing the surface of the front face, since such peripheral part of the optical lens is very unlikely to be used by the wearer experiencing the typical gazing directions distribution.

Among the parameters that do not influence the optical function in the visible band, one may consider the anti-reflecting coating to be placed on the front and/or rear surface of the optical lens.

Both types of parameters may be changed during the optical equipment parameter modifying step.

The light distribution corresponding to the modified optical equipment is determined during the light distribution determining step S114.

The light distribution comparing step S110, the optical lens parameter modifying step S112, and the light distribution determining step S114 are repeated until the difference between the light distribution and the target light distribution is smaller than a threshold value.

As pointed out, the optical equipment parameter modifying step may comprise modifying parameters that have no influence on the optical function, such as the type of anti-reflecting coating placed on the optical lens.

According to such embodiment there is no need to further determine the optical function.

According to some embodiments of the invention, the optical equipment parameter modifying step may comprise modifying parameters that influence the optical function, such as the surface profile of the optical lens.

The method according to such embodiments, the optical equipment modifying step may comprise modifying further parameters so as to limit the impact of the change on the optical function and the method may further comprise an optical function evaluation step. This parameter modifying step is not shown on any figure.

During the optical function evaluation step, the optical function of the modified optical equipment is determined, for example by ray tracing simulation, and compared to the optical function requirements. The lens designer may determine the amount of change in the optical function allowed when modifying the optical equipment. For example, the lens designer may consider that the changes of parameters of the optical equipment are to be limited to the changes that can be compensated for so as to maintain the optical function of the optical lens.

The parameters that may be modified during the optical equipment modifying step may also be limited by the manufacturing method available for manufacturing the optical equipment, in particular for manufacturing the optical lens.

In the case of a machining process classically using semi-finished optical lens blank, the degrees of freedom on the front face are limited. Therefore, the possible modifications on the rear face of the optical lens during the optical equipment modifying step S112 are also limited.

An object of the present invention would then be to select the semi-finished lens blank, and thus the front face of the ophthalmic lens, taking into account not only the optical function but also the protection against light radiation, such as UV radiation. It has been demonstrated that it is possible to manage to maintain the optical performances of an optical lens over a wide range of front face curves. Therefore, it is possible over such range of front face curves to modify the rear surface of the optical lens so as to optimize the light distribution over the exposure area.

The method of the invention may be applied when the manufacturing method allows digital surfacing of both surfaces of the optical lens. In such case the front and rear surface of the optical lens can be modified within the limits of the manufacturing process and aesthetic criteria, providing a great freedom on the change of parameters of the optical equipment while maintaining the optical performances of the optical lens.

Example 1

The inventors have implemented the method according to the invention for a unifocal optical lens, considering a manufacturing process allowing modifying both the front and back surface of the optical lens.

In this example, the inventors have considered the distribution of UV over the cornea of the wearer trying to avoid UV radiation reach the cornea of the wearer. The UV radiation considered in this example are between 280 and 380 nm and are considered as coming from a source located spatially behind the wearer forming an incidence angle of 15° with a horizontal plane (elevation) and having horizontal impact on the lens at 33°. The simulations were performed on the right eye of the wearer.

A wearer's face morphology is considered, the head of the wearer is oriented 15° downwards, corresponding to natural line of sight when walking.

The wearer has a prescription of Sphere of −2.5 diopters.

Two spectacle frames with different wearer parameters but on a single wearer are considered in this example. A single refractive material with a refractive index of 1.65 at a wavelength of 587 nm is considered for both spectacle frames. A single optical design is considered for the optical lens comprised in the equipment. The initial optical lens is chosen with a spherical rear surface having a radius of curvature of 110 mm for the rear surface and a radius of curvature of 190 mm for the front surface.

The first spectacle frame is considered with a wrap angle of 8° and a pantoscopic angle of −8°.

The ray tracing simulation indicates that for the initial optical equipment, i.e. the optical lens mounted in the first spectacle frame, almost all of the cornea of the wearer receives UV radiation.

The rear surface curvature radius is then changed to 100 mm. To compensate for this geometrical modification of the lens and to keep the same optical function for the optical lens the radius of curvature of the front surface is changed to 162.2 mm. The ray tracing simulation indicates that the UV radiation is spatially shifted to the nasal side of the wearer's eye and impacts a smaller area of the cornea of the wearer.

The rear surface curvature radius is then changed to 93 mm, and the front surface radius of curvature is changed to 144.7 mm. The ray tracing simulation indicates that the UV radiation is even more spatially shifted to the nasal side of the wearer's eye and impacts a smaller area of the cornea of the wearer.

The method according to the invention provides that with a curvature radius of 92 mm for the rear surface and 142.3 mm for the front face, no UV radiation reaches the cornea of the wearer.

The inventors have run the method according to the invention with a spectacle frame having a wrap angle of 10° and a pantoscopic angle of −8°. The method according to the invention provides a value of 105 mm for the curvature radius of the rear face and 175.6 mm for the front surface so that no UV radiation reaches the cornea of the wearer.

Example 2

The inventors have implemented the method according to the invention to select the most appropriate anti-reflecting coating.

Typically, in such example, and more generally when the parameter(s) of the optical equipment to be changed in the method of the invention do not affect the optical function of the optical lens, the optical function is optimized in first instance. The optical cost function is not recalculated together with the light protection cost function.

This example is implemented for UVA and UVB, i.e. between 280 nm and 380 nm.

The light protection target is to reduce the level of UV radiation reaching the cornea of the wearer after having being reflected on the rear surface of the optical lens.

The parameters used in the simulation are summarized in the following chart.

| Parameter | Value |
|---|---|
| Type of head | Caucasian model head |
| Tilt of the head | 15° down (natural line of sight while walking) |
| Frame geometry | Classical rectangular frame, low wrap |
| Wearing Conditions | Tilt 8°, 0° wrap, eye-lens distance 12 mm |
| Lens geometry | Plano base 4 (R = 132.5 mm) |
| Lens material | Material with a refractive index of 1.65 at a wavelength of 587 nm (MR7) |
| AR stacks | Standard AR (angular stability), AR only optimized for high angles of incidence |
| Solar UV irradiance | Measured value of 21 Wm−2 |
| Incidence of radiation | Computed solar elevation 40° (St Pete, Dec. 1st 2 pm) Horizontal impact on the lens of 30° |
| Spectral Weighting of radiation | Spectral line based on the ASTM G173-03 norm |
| | Spectral UV hazard function S (λ) |
| Detector characteristics | Plane on the location of cornea, same diameter as cornea |

The source spectral distribution is modelled using a spectral line based on the ASTM G173-03 norm (American Society for Testing and Materials). (UV spectral ranks in this norm are similar to what is defined in CIE85 norm).

The spectral UV hazard function S (λ) is a function first defined by D. Sliney and collaborators and now used as a reference: such as in ICNIRP guidelines, this represents the eye spectral sensitivity in the UV spectral domain.

UV exposure limits are considered according to INCNIRP Guidelines on limits of exposure to UV radiation published in Health Physics 87 (2):171-186, 2004. This paper states that within an 8 hours period the total (unweighted) UV spectral radiant exposure in the area 315 to 400 nm should not exceed $10^4$ J·m$^{-2}$ and UV exposure between 180 and 400 nm should not exceed 30 J·m$^{-2}$ effective spectrally weighted.

This limit represents the conditions under which it is expected that nearly all individuals may be repeatedly exposed without acute adverse effects and without noticeable risk of delayed effects.

Figure 3:
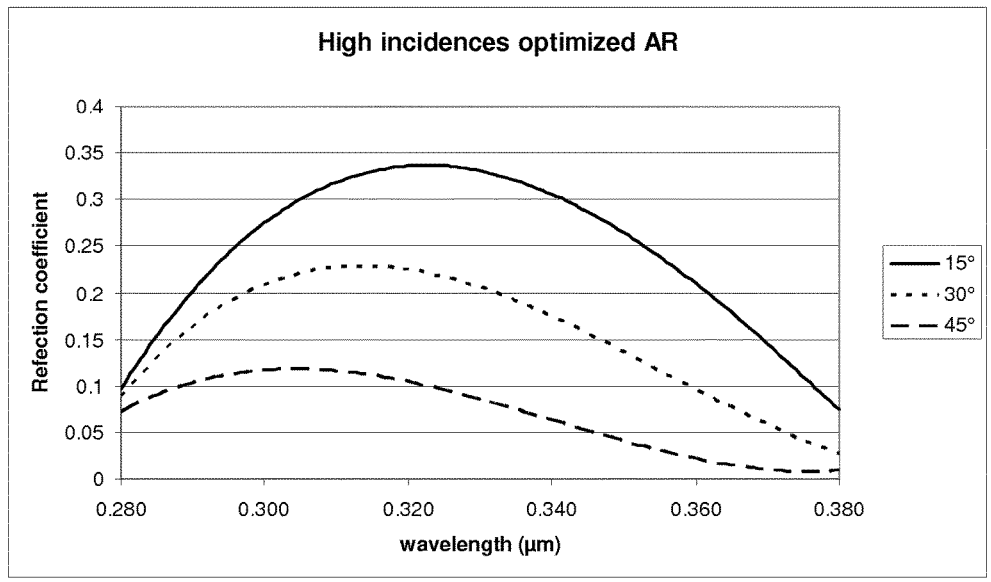
FIGS. 3 and 4 represent the features of anti-reflecting coatings.

The features of a first anti-reflecting coating are represented on FIG. 3.

Figure 4:
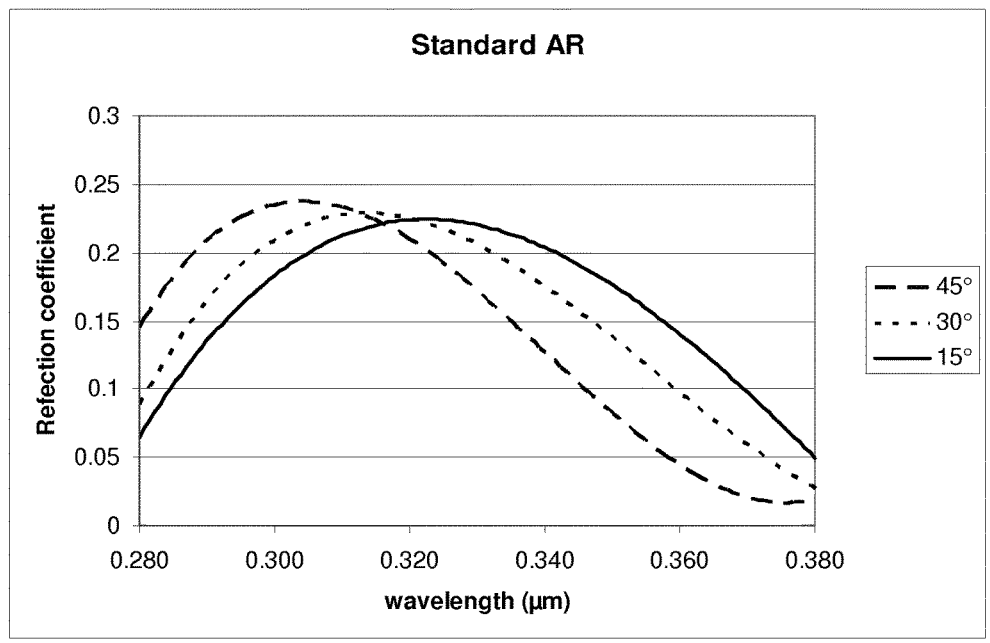

The features of a second anti-reflecting coating are represented on FIG. 4.

The inventors have observed that for a wrap angle of 0°, the time of exposure to reach the threshold value is very similar for both anti-reflecting coatings.

For wrap angle of 10°, in considering all other parameters being equal, the inventors have observed that the first anti-reflecting coating allows a time of exposure to reach the threshold of 1 h37 min whereas the second anti-reflecting coating allows a time of only 1 h13 min.

Therefore, the method according to the invention allows an optimized selection of the anti-reflecting coating according to the wrap angle of the optical equipment.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method implemented by processing circuitry with an associated non-transitory computer-readable storage medium for determining an optical equipment comprising at least one optical lens and a spectacle frame, the optical lens being adapted to be mounted in the spectacle frame in front of a wearer eye, the method comprising:
a wearer data obtaining step, during which wearer data relating at least to the wearer's optical requirements, to a wearer's face morphology and to an optical equipment position in respect with the wearer face when said optical equipment is worn by said wearer are obtained;
an optical cost function obtaining step, during which an optical cost function is obtained, the optical cost function being related to an optical function of the at least one optical lens when said optical equipment is worn by said wearer;
a light protection cost function obtaining step, during which a light protection cost function is obtained, the light protection cost function being related to at least a spectral irradiance estimation over the wearer eye and/or wearer skin in a peri-orbital zone of the wearer eye under at least a given condition when said optical equipment is worn by said wearer;
an optical equipment determining step, during which the optical equipment that minimizes a difference between a global cost function and a target value of the global cost function is determined by modifying at least one parameter of the optical equipment, the global cost function being a function of the optical and the light protection cost functions; and
an optical equipment manufacturing step during which the optical equipment is manufactured based on the determined optical equipment.

2. The method according to claim 1, wherein the given condition comprises information regarding a location of at least one scene in which said wearer stands, said at least one scene comprising a spatial repartition of spectral albedo and at least one radiance source, said at least one radiance source having a determined emitting spectrum and a position in respect with the wearer face when said optical equipment is worn by said wearer, wherein said light protection cost function obtaining step involves a step of modeling irradiance coming from said at least one scene highlighted by said at least one radiance source.

3. The method according to claim 2, wherein said determined emitting spectrum is limited to at least a spectral window such as a UV-A window, UV-B window, visible window, near infrared window, mid infrared window, or far infrared window.

4. The method according to claim 1, said optical cost function being determined by considering a first spectral window, said light protection cost function being determined by considering a second spectral window, wherein said first spectral window and said second spectral window are different.

5. The method according to claim 1, wherein said optical equipment determining step involves a step of determining a set of value ($OCF_1$, ..., $OCF_n$; $LPCF_1$, ..., $LPCF_n$) for said optical cost function and for said light protection cost function in considering a set of value of at least one parameter of the optical equipment for determining said optical equipment that minimizes the difference between a global cost function and a target value of the global cost function.

6. The method according to claim 5, wherein said at least one parameter of the optical equipment is a geometrical parameter of the at least one optical lens.

7. The method according to claim 5, wherein said at least one parameter of the optical equipment is chosen within the list consisting of:
- a distance separating a rear face of said at least one optical lens and the wearer eye, when said optical equipment is worn by said wearer;
- a wrap angle and/or a pantoscopic angle of said at least one optical lens;
- a curvature map of the rear face of said at least one optical lens;
- a curvature map of a front face of said at least one optical lens; and
- a contour shape of said at least one optical lens.

8. The method according to claim 5, wherein the at least one parameter of the optical equipment is an anti-reflecting coating parameter.

9. The method according to claim 8, wherein the anti-reflecting coating parameter relates to a choice of an anti-reflecting coating in a list of anti-reflecting coatings.

10. The method according to claim 5, wherein said at least one parameter of the optical equipment is a geometrical parameter of the spectacle frame.

11. The method according to claim 5, wherein said at least one parameter of the optical equipment is chosen within the list consisting of:
- a spatial map of radiance attenuation coefficient of said at least one optical lens; and
- a radiance polarization coefficient of said at least one optical lens.

12. The method according to claim 1, wherein the target value of the global cost function is determined at least partially from an eye-safety recommendation comprised in a standard.

13. The method according to claim 1, wherein the target value of the global cost function is determined at least partially from wearer data provided by the wearer or measured on the wearer.

14. The method according to claim 1, wherein said light protection cost function obtaining step involves a step of determining a position of the least one optical lens in respect with the wearer eye when said optical equipment is worn by said wearer, and a step of modeling the position of the least one optical lens considering real wearing parameters determined on the wearer when the wearer is wearing a try frame identical to the spectacle frame.

15. The method according to claim 1, wherein the wearer data further comprises data belonging to a type chosen within the list consisting in:
- wearer vision behavior;
- wearer personalized light sensitivity;
- wearer aesthetic optical lens preference;
- wearer occupational activity; and
- wearer age.

\* \* \* \* \*